(12) United States Patent
Ikeda

(10) Patent No.: US 6,239,896 B1
(45) Date of Patent: May 29, 2001

(54) ELECTROPHOTOGRAPHIC DISPLAY DEVICE AND DRIVING METHOD THEREFOR

(75) Inventor: Tsutomu Ikeda, Hachiohji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/321,717

(22) Filed: May 28, 1999

(30) Foreign Application Priority Data

Jun. 1, 1998 (JP) .................................................. 10-151181

(51) Int. Cl.$^7$ ........................................................ G02F 1/01
(52) U.S. Cl. ............................ 359/240; 359/241; 359/237
(58) Field of Search .................................... 359/242, 240, 359/241, 239, 238, 237, 248, 247, 245

(56) References Cited

U.S. PATENT DOCUMENTS

| Re. 28,360 | 3/1975 | Evans et al. ............................. 358/56 |
| 3,612,758 | 10/1971 | Evans et al. ....................... 178/5.4 R |
| 3,670,323 | 6/1972 | Sobel et al. ....................... 340/324 R |
| 3,909,116 | 9/1975 | Kohashi ................................. 350/267 |
| 4,126,854 | 11/1978 | Sheridon ............................... 340/373 |
| 5,966,233 | * 10/1999 | Fujiwara et al. ..................... 359/240 |

FOREIGN PATENT DOCUMENTS

| 6-52358 | 7/1994 | (JP) . |
| 9-185087 | 7/1997 | (JP) . |
| 9-211499 | 8/1997 | (JP) . |

* cited by examiner

Primary Examiner—Hung Xuan Dang
(74) Attorney, Agent, or Firm—Fitzpatrick, Cella, Harper & Scinto

(57) ABSTRACT

An electrophoretic display device exhibiting a memory characteristic, i.e., capable of holding a display state even after removal of an applied voltage, is provided by introducing a mechanism that colored electrophoretic particles are retained in position for display in the absence of an electric field. For the purpose, at least one of a pair of substrates holding therebetween colored electrophoretic particles together with an insulating liquid is provided with a magnetism by disposing a magnetic material on or in the substrate together with the use of magnetized colored electrophoretic particles so as to retain the colored electrophoretic particles in position under the action of a magnetic Coulomb force exerted by the magnetized substrate.

9 Claims, 8 Drawing Sheets

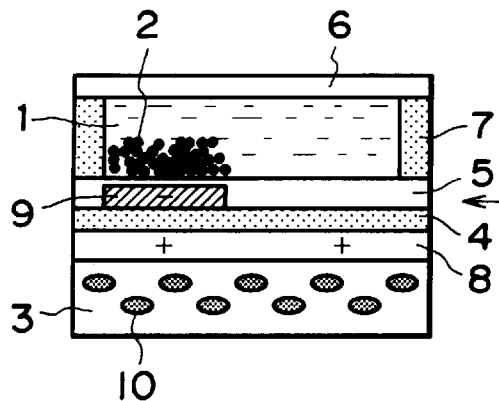
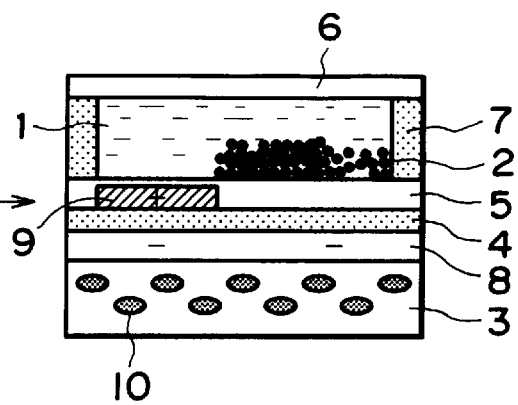
FIG. 1A  FIG. 1B
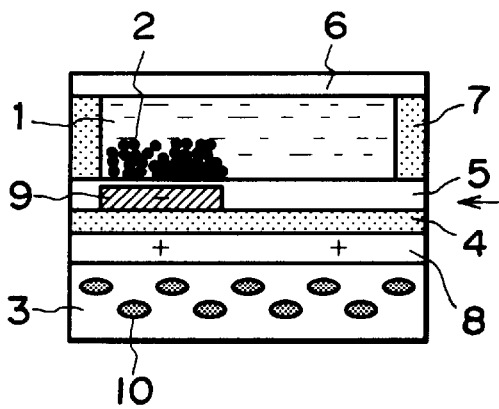
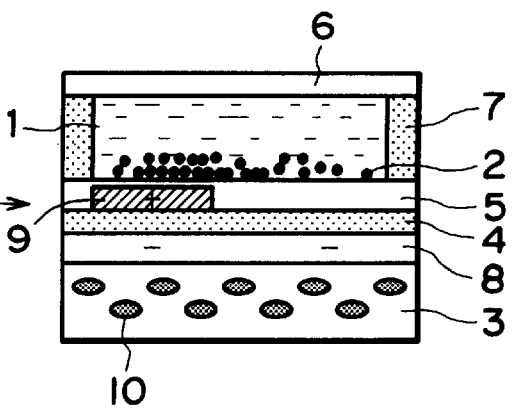
FIG. 2A  FIG. 2B

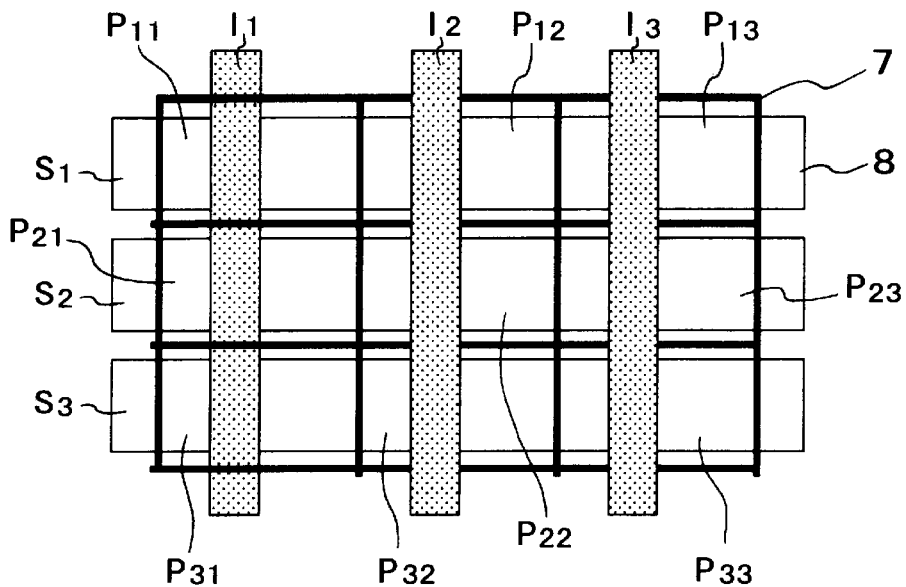
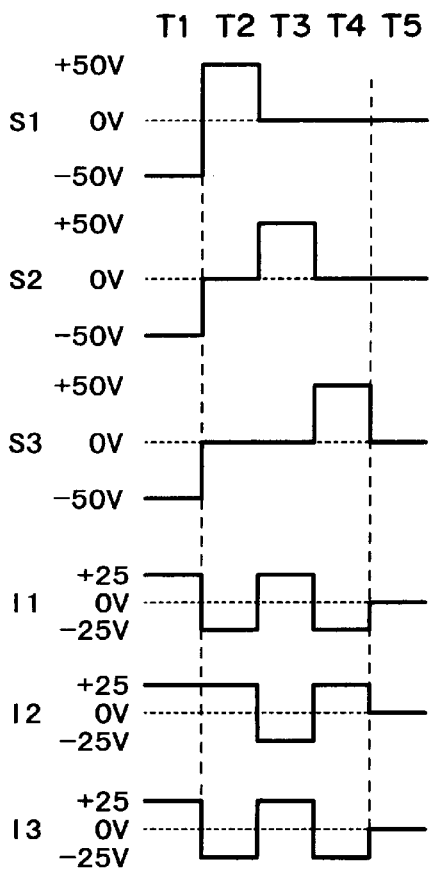
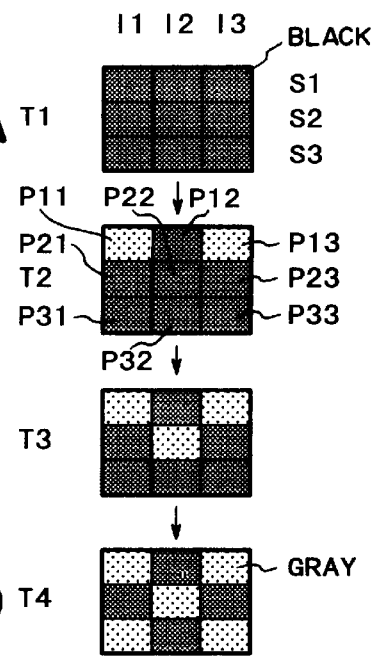
FIG. 7A
FIG. 7B
FIG. 7CA T1
FIG. 7CB T2
FIG. 7CC T3
FIG. 7CD T4

ELECTROPHOTOGRAPHIC DISPLAY DEVICE AND DRIVING METHOD THEREFOR

FIELD OF THE INVENTION AND RELATED ART

The present invention relates to an electrophoretic display device wherein colored electrophoretic particles or charged migrating particles are moved to effect a display, and a driving method therefor In recent years, accompanying the progress of data processing apparatus, there has been an increasing demand for a display device requiring a small power consumption and a small thickness, and extensive study and development have been made on devices satisfying such a demand. Among these, a liquid crystal display device wherein an alignment of liquid crystal molecules is electrically controlled to change optical characteristics has been extensively developed and commercialized as a display device satisfying the demand described above.

However, such liquid crystal display devices are still accompanied with problems of visual load on human eyes, such as difficulty of recognizing characters on display depending on a viewing angle or due to reflection light, and flickering and low luminance of light sources. Accordingly, extensive study is still made for new-types of display devices causing less visual load on human eyes.

Reflection-type display devices are expected from the viewpoints of lower power consumption and less visual load on human eyes. As a type thereof, an electrophoretic display device has been proposed by Harold D. Lees, et al. (U.S. Pat. No. 3,612,758). Electrophoretic display devices are also disclosed in Japanese Laid-Open Patent Application (JP-A) 9-185087, JP-A 9-211499, and Japanese Patent Publication (JP-B) 6-52358.

A structure and an operation of an electrophoretic display device ares described with reference to FIGS. 8A and 8B. Referring to these figures, a display device 95 includes a dispersion layer comprising an insulating liquid 94 containing a colorant dissolved therein and charged electrophoretic or electrophoretically migrating particles 93 dispersed in the insulating liquid 94, and a pair of oppositely disposed electrodes 91 and 92 sandwiching the dispersion layer. When a voltage is applied across the dispersion layer via the electrodes 91 and 92, the colored electrophoretic particles 93 are attracted to an electrode of a polarity opposite to that of the charge of the particles 93. A display is performed by a combination of the color of the electrophoretic particles 93 and the color of the insulating liquid 94 having a different color from the electrophoretic particles 93 due to the colorant dissolved therein.

More specifically, when the first electrode 91 is made a negative electrode and the second electrode 92 is made a positive electrode, positively charged colored electrophoretic particles 93 are moved or migrated and attached to the surface of the first electrode 91 disposed closer to a viewer, thereby displaying the color of the particles 93 (FIG. 8B).

On the other hand, when the first electrode 91 is made a positive electrode and the second electrode 92 is made a negative electrode, the positively charged electrophoretic particles 93 are moved and attached to the surface of the second electrode farther from the viewer to display the color of colorant contained in the insulating layer 94 (FIG. 8A).

Such a conventional electrophoretic display device as described with reference to FIGS. 8A and 8B, however, involves the following problems.

The colored electrophoretic particles 93 are attracted to an electrode by an electric field (or an electrostatic attractive force), so that when the voltage application to the electrodes is terminated, the electrophoretic particles are allowed to move, thus failing to exhibit a memory characteristic. Accordingly, In order to retain a display state, it is necessary to continually apply the voltage to the electrodes, thus requiring a substantial power consumption therefor.

Further, such a conventional electrophoretic display device fails to exhibit a clear threshold characteristic with respect to the movement of the electrophoretic particles 93 between the electrodes, which is required to effect a simple matrix drive display (as will be described with reference to FIG. 7A, etc. regarding an embodiment of the present invention).

It is essential that the insulating liquid 94 is colored or made opaque. Accordingly, it is difficult to compose the insulating liquid of a single component, so that some coloring particles have to be dispersed or some colorant has to be dissolved in the insulating liquid. Further, the reflectance of the display is liable to be lowered due to adsorption of the colorant dissolved in the insulating liquid onto the colored electrophoretic particles and intrusion of the colored insulating liquid between the electrode surface and the colored electrophoretic particles attached thereto, thus failing to provide a high contrast. Further, the presence of such colorant (particles) is liable to provide an unstable factor in electrophoresis, thus being liable to lower the performance, life and stability of the display device. Further, in the conventional display device, the number of displayable colors is limited to two, i.e., those of the colored electrophoretic particles and the insulating liquid, so that a multi-color display is difficult. Further, according to the conventional display device, a binary display is ordinarily performed, and so-called gradational display including a display of a halftone color is difficult.

SUMMARY OF THE INVENTION

In view of the above-mentioned problems of the prior art, a principal object of the present invention is to provide an electrophoretic display device having a threshold characteristic and a memory characteristic.

According to the present invention, there is provided an electrophoretic display device, comprising: a first substrate and a second substrate disposed opposite to each other with a gap therebetween, a first electrode and a second electrode disposed at at least partially deviated positions on the first substrate, a transparent insulating liquid filling the gap between the first and second substrates, and colored electrophoretic particles carried in the insulating liquid so as to be movable between the first electrode and the second electrode, wherein the first substrate has a magnetism, and the electrophoretic particles also have a magnetism.

According to the present invention, there is also provided a driving method, wherein the above-mentioned electrophoretic display device is driven by applying different level of voltages between the first electrode and the second electrode, so that the colored electrophoretic particles are moved between the first and second electrodes at a voltage exerting an electrostatic force larger than a magnetic Coulomb force acting between the electrophoretic particles and the first substrate, and the colored electrophoretic particles are retained on the first or second electrode at a voltage exerting an electrostatic force smaller than the magnetic Coulomb force acting between the electrophoretic particles and the first substrate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are sectional views showing two states of a display device according to an embodiment of the invention.

FIGS. 2A and 2B are sectional views showing two states including a halftone display state of a displayed device according to an embodiment of the invention.

FIG. 7A is a plan view of an electrode matrix of a matrix display device according to the invention, FIG. 7B shows a set of time-serial voltage signal waveforms applied to respective electrodes, and FIGS. 7CA–7CD are schematic plan views showing various display states of the matrix display device.

DESCRIPTION OF THE PREFERRED EMBODIMENTS

Figure 3:
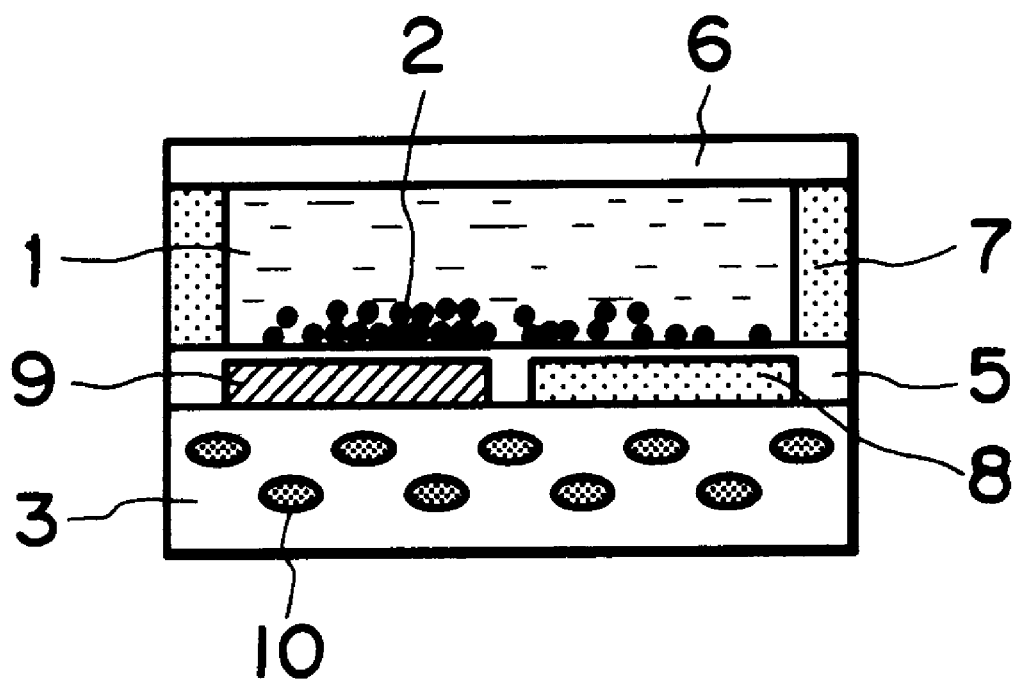
FIG. 3 is a sectional view of another embodiment of the display device according to the invention.

FIGS. 1A and 1B are sectional views showing two states of an embodiment of the electrophoretic display device according to the present invention.

Referring to FIGS. 1A and 1B, this embodiment of the display device uses an insulating liquid 1 which is a transparent insulating liquid free from inclusion of colored particles or dissolved colorant.

The display device further includes a pair of first substrate 3 and second substrate 6 disposed opposite to each other with a gap therebetween, and a first electrode 8 and a second electrode 9 which are disposed at horizontally deviated positions on the first substrate 3 so as to provide an electric field therebetween for controlling a spatial distribution in the device. As a result, magnetic colored electrophoretic particles (charged migrating particles) 2 carried within the insulating liquid 1 may be moved along the electric field between the first and second electrodes, i.e., horizontally relative to the first substrate 3. In this embodiment, the first electrode 8 and the second electrode 9 are disposed to partially overlap each other and electrically isolated from each other by inserting a first insulating layer 4 therebetween, and the second electrode 9 thereon is further coated with a second insulating layer 5. By coloring any one of the first insulating layer 4, first electrode 8 and first substrate 3 to providing an optical characteristic (hue, reflectivity, etc.) different from those of the electrophoretic particles 2 and the second electrode 9, a binary color display, such as a monochromatic display, can be effected accompanying the movement of the colored electrophoretic particles 2.

The transparent insulating liquid 1 and the magnetic colored electrophoretic particles 2 are held within a space defined by the insulating film 5, the second substrate and a sealing or partitioning wall 7. Below the second insulating layer 5, the second electrode 9 is locally formed, and further via the first insulating layer 4, the first electrode 8 is formed. The first substrate 3 is made magnetic by incorporation therein of magnetic powder 10 in this embodiment (as shown) or by application of such magnetic powder thereon. As a result, during the period of no voltage application, the magnetic colored electrophoretic particles 2 are attracted to the first substrate 3 within the space present together with the insulating liquid 1 under the action of a magnetic Coulomb force acting between the particles 2 and the first substrate 3.

In this embodiment of the display device, the magnetized and charged color electrophoretic particles 2 are moved within the transparent insulating liquid 1 in parallel with or horizontally with respect to the first substrate 3 between the first electrode 8 and the second electrode 9 by applying a voltage between the first electrode 8 and the second electrode 9, thereby effecting a display. Further, at the time of no voltage application or application of a voltage below a threshold given by a magnetic constraint acting between the particles 2 and the first substrate 3, the position of the electrophoretic particles 2 is fixed by attraction to the first substrate 3.

The colored electrophoretic particles 2 may for example be charged according to the following mechanism.

Colored migrating particles 2 may be charged positively or negatively in an insulating liquid 1 due to formation of an electric double layer caused by transfer of a charge between the particle 2 and the insulating liquid 1, as the phenomenon per se has been known. More specifically, positive ions or negative ions in the insulating liquid 1 are specifically adsorbed onto the colored particles 2, so that the colored particles 2 are positively or negatively charged.

Now, an embodiment of the driving method for the display device is described with reference to FIGS. 1A and 1B.

Now, it is assumed that magnetized and black-colored electrophoretic particles 2 are positively charged, while they can be charged negatively in some other cases. As mentioned above, the magnetized and colored electrophoretics 2 are attracted toward the first substrate 3 magnetized by inclusion of the magnetic powder 10 in an ordinary state, i.e., under no voltage application or under application of a weak voltage.

In this state, if a relatively large voltage is applied between the second electrode 9 as a positive electrode and the first electrode 8 as a negative electrode so as to exert onto the positively charged electrophoretic particles 2 an electrostatic force which is larger than the magnetic Coulomb force acting between the particles 2 and the first substrate 3, the positively charged electrophoretic particles 2 are moved and attached to the negative first electrode 8, so as to mask the first electrode 8 with the black particles 2. At this time, even if the voltage supply to the electrodes 8 and 9 is terminated, the magnetic colored particles 2 are secured on the first electrode 8 by the magnetic Coulomb attractive force exerted by the magnetic first substrate 3. As a result, the color of the magnetic particles 2 on the first electrode 8 and the color of the second electrode 9 are observed from a viewer's die (i,e., the side of the upper second substrate 6) (FIG. 1B).

Now, if a reverse polarity of relatively large voltage is applied between the first electrode 8 as a positive electrode and the second electrode 9 as a negative electrode, the positively charged and colored electrophoretic particles 2 are moved and attached onto the negative second electrode 9, whereby the color of the electrophoretic particles 2 on the second electrode 9 and the color of the first insulating layer 4, the first electrode 8 or the first substrate 3 are observed from the viewers side (i.e., the side of the second substrate 6) (FIG. 1A). This state is retained even after termination of the voltage due to a magnetic Coulomb force exerted by the first substrate 3.

In the above-described manner, if the second electrode 9 and the electrophoretic particles 2 are both colored in black, and the first electrode 8 is colored in white, a black-white monochromatic display is effected. On the other hand, if a colored layer (e.g., in yellow, cyan, magenta, etc.) is provided, a color display becomes possible. It is desirable that the second electrode 9 and the electrophoretic particles 2 are colored in the same color or similar colors. A colored layer having an optical characteristic different from that of the colored electrophoretic particles 2 may be provided to the first electrode 8, the first insulating layer 4 or the first substrate 3, or between these members or as a layer behind the first substrate 3 and as a horizontally entire layer or local layer, as far as it is observable from the viewer's side. Herein, the color of the colored particles, the electrode or the insulating layer can be the color of the material thereof per se or may be provided by mixing or overcoating with a coloring matter. The magnetic colored electrophoretic particles 2 may be composed of a single species of material or a combination of two or more species of materials.

In case of using a display device according to this embodiment, it becomes possible to dispense with coloring of the insulating liquid by inclusion of coloring particles or dissolution of a colorant, so that it becomes possible to obviate the adsorption of colorant or coloring particles onto the colored electrophoretic particles. Further, it is also possible to obviate the intrusion of the colorant or coloring particles between the electrode surface and the colored electrophoretic particles attached onto the electrode surface. Accordingly, it becomes possible to provide a display device capable of realizing a high reflectance and a high contrast.

Further, as the colored electrophoretic particles attached onto the electrode of display is secured thereat by a magnetic Coulomb force exerted by the magnetic first substrate even after the termination of the voltage for providing the display state so that the display exhibits a memory characteristic. Further, the magnetic Coulomb attractive force can provide a certain threshold in applied voltage for display.

In the driving method of the display device according to the present invention, a horizontal movement of the electrophoretic particles between the electrodes is utilized for display. By using this characteristic, a gradational display becomes possible according to a second embodiment of the driving method as will be described with reference to FIGS. 2A and 2B wherein identical numerals are used for denoting like members as in FIGS. 1A and 1B.

Such a gradational display may be accomplished by a partial movement of magnetic and colored electrophoretic particles 2 from one electrode to the other electrode as shown in FIG. 2. Such a partial movement of electrophoretic particles 2 may for example be effected by control of a voltage application time (or pulse width) according to a pulse width-modulating gradational display scheme.

Further, a voltage-modulating gradational display may be accomplished by control of an applied voltage (or pulse height), use of a mixture of colored electrophoretic particles having different chargeabilities, or use of a mixture of colored electrophoretic particles having different sizes or shapes.

In any case, a gradational display is performed by controlling the distance of movement of the colored electrophoretic particles to effect an area-based gradational display by controlling the magnitude or duration of the voltage applied between the electrodes.

In addition to the above, an improved gradational display characteristic may be realized by using a mixture of colored electrophoretic particles having different chargeabilities, a mixture of colored electrophoretic particles 2 having different levels of magnetism or a mixture of colored electrophoretic particles 2 having different sizes or shapes.

Hereinbelow, a gradational display method according to a voltage modulation scheme will be described more specifically with reference to FIGS. 2A and 2B.

Referring to FIGS. 2A and 2B, it is assumed that magnetized and colored electrophoretic particles are positively charged in a transparent insulating liquid 1. If a voltage exerting an electrostatic force larger than a magnetic Coulomb force onto the magnetized and colored electrophoretic particles 2 is applied between a second electrode 9 as a negative electrode and a first electrode 8 as a positive electrode, the positively charged electrophoretic particles 2 are collectively moved to and attached onto the negative second electrode 9, and secured thereat by the magnetic Coulomb force toward the first substrate 3. As a result, the color of the colored electrophoretic particles 2 on the second electrode 9 and a different color of the first insulating layer 4, the first electrode 8 or the first substrate 3 are observed from or displayed to a viewer's side (the side of the second substrate 6) (FIG. 2A).

Then, if a reverse polarity of voltage at a controlled amplitude is applied between the first electrode 8 as a negative electrode and the second electrode 9 as a positive electrode to control the amount of positively charged colored electrophoretic particles 2 moved toward the first electrode 8, i.e., to control the area of the colored electrophoretic particles covering the first electrode 8. Depending on the area of the coverage, a mixture color among the color of the colored electrophoretic particles 2, the color of the second electrode 9 and the different color of the first insulating layer 4, the first electrode 8 or the first substrate 3, is displayed to the viewer's side (the side of the second substrate 6). In this state, the colored electrophoretic particles 2 are secured thereat again by the magnetic Coulomb attractive force toward the first substrate 3. In this manner, if the second electrode 9 and the electrophoretic particles 2 are both colored in black, and the first electrode 8 is colored in white, a white and black gradational display becomes possible.

By using the second display method of this embodiment, the distance (or amount) of the colored electrophoretic particles moved from one electrode to the other electrode can be controlled, whereby an areal gradational display can be realized.

Further, the resultant display state is retained even after termination of voltage application between the first electrode 8 and the second electrode 9 from a power supply circuit (not shown) by securing of the colored electrophoretic particles 2 with a magnetic Coulomb attractive force toward the first substrate 3, so that a display having a memory characteristic is realized.

Some Modifications

In the embodiment of display device described with reference to FIGS. 1A and 1B (and also FIGS. 2A and 2B), the first electrode 8 and the second electrode 9 are coated with the second insulating layer 5 in order to obviate irreversible adsorption of the colored electrophoretic particles 2 onto the first electrode 8 and the second electrode 9. However, by appropriately selecting the materials of the colored electrophoretic particles 2, the first electrode 8 and the second electrode 9, such irreversible adsorption of the colored electrophoretic particles 2 onto the first electrode 8 and the second electrode 9 can be obviated. Accordingly, it is possible to expose the second electrode 9 so as to allow a direct attachment of the colored electrophoretic particles 2 onto the second electrode 9. It is further possible to expose the first electrode 8 so as to allow the colored electrophoretic particles 2 to be directly attached onto the first electrode 8.

Another Embodiment

Another embodiment of the display device according to the present invention is described with reference to FIG. 3, wherein identical numerals are used to denote like members as in FIGS. 1A and 1B.

In the embodiment of FIG. 3, a first electrode 8 and a first electrode 9 are juxtaposed in a substantially same plane on a first substrate 3. The display device of FIG. 3 can be operated in a similar manner as in the one of FIG. 1A.

The electrophoretic display device of the present invention inclusive of any of the above-described embodiments allows a rewritable display, requires no or only a small energy for retaining a display state (because of a memory characteristic), is excellent in portability and display quality, and can be used as a paper display medium in substitution for a display with a hard copy (paper, etc.).

Production Process

Now, an example of process for production of the display device according to the present invention will be described with reference to FIGS. 4A to 4E which are sectional views for illustrating a process for production of the embodiment shown in FIGS. 1A and 1B.

Figure 4A:
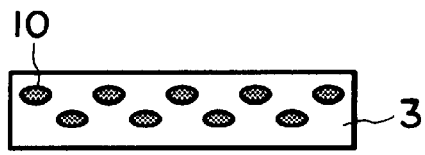
FIGS. 4A–4E are sectional views for illustrating a process for producing a display device according to the invention.

First of all, a first substrate 3 is formed from, e.g., a polymeric material, such as polyethylene terephthalate (PET), polyether sulfone (PES), or polycarbonate; or an inorganic material, such as glass or quartz. By mixing powder of such a substrate material with fine magnetic powder 10 of, e.g., neodium magent, samarium-iron-nitrogen magnet, samarium-cobalt magnet, alnico magnet or ferrite magnet, and the resultant mixture is formed into a sheet 3 (as shown in FIG. 4A). Alternatively, it is possible to coat a sheet of a substrate material as described above with a layer of magnet material as described above.

Figure 4B:
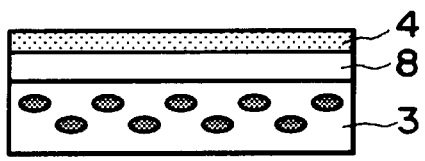

Then, a first electrode 8 is formed on the first substrate 3. The first electrode 8 may be formed of any electroconductive material capable of patterning, inclusive of a transparent conductor material, such as indium tin oxide (ITO). After patterning of the first electrode 8, e.g., according to a photolithographic process, as desired, a first insulating layer 4 is formed over the first substrate 8. The first insulating layer 4 may preferably comprise a film-forming material capable of providing a pin hole-free film showing a high transmittance for visible light rays. Examples of such a film-forming material may include polyimide, PET and polymethylmethacrylate. If fine powdery pigment, such as titanium oxide or zinc oxide, is mixed within the first insulating layer, it is possible to provide an insulating layer 4 also functioning as a white reflection layer (FIG. 4B).

Then, a second electrode 9 is formed. The second electrode 9 may comprise an electroconductive material preferably be colored in a color close to that of colored electrophoretic particles described later. For example, in case where black electrophoretic particles are used, a dark black electroconductive material, such as titanium carbide or graphite, may be used. The second electrode 9 is coated with a second insulating layer 5 of, e.g., polyimide, PET or PMMA (FIG. 4C) for the purpose of, e.g., preventing irreversible adsorption of colored electrophoretic particles on the second electrode 9.

As a supplement to the above description, the color(s) for display can be attained by utilizing the color(s) of the electrode materials or insulating materials per se or by applying an additional coloring layer of a desired color at a desired part on an electrode, an insulating layer or a substrate. It is also possible to mix a coloring material with a material constituting the insulating layer or substrate.

Figure 4C:
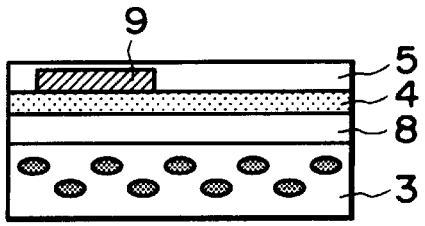
Figure 4D:
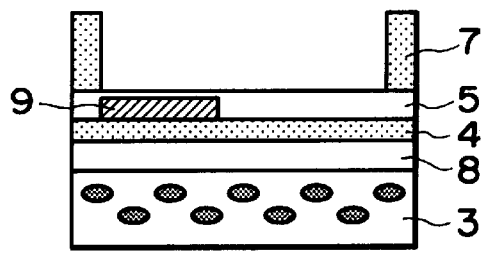

Then, a sealing or partitioning wall member 7 is formed on (the second insulating layer 5 of) the first substrate 3 (FIG. 4D). The sealing or partitioning wall 7 may be formed of a polymeric material through an appropriate process. For example, it is possible to use a process wherein a layer of a photosensitive resin is formed by, e.g., application, followed by exposure to actinic light and wet development. It is also possible to form the partitioning wall 7 by bonding a separately produced partitioning wall member or by molding such a partitioning wall together with a light-transmissive second substrate.

Then, a layer of an adhesive 11 is formed on top of the partitioning wall member 11 for bonding with a second substrate 6, and the space within the partitioning wall 7 is filled with an insulating liquid 1 and colored electrophoretic particles 2. The insulating liquid 1 may comprise a colorless transparent liquid, such as silicone oil, toluene, xylene or high-purity petroleum.

The magnetizable electrophoretic particles 2 of, e.g., in black color, may comprise a chargeable material obtained, e.g., by mixing carbon and magnetite with a resin, such as polyethylene or polystyrene. The electrophoretic particles 2 may ordinarily have a particle size (diameter) on the order of 0.1 $\mu$m–50 $\mu$m.

Figure 4E:
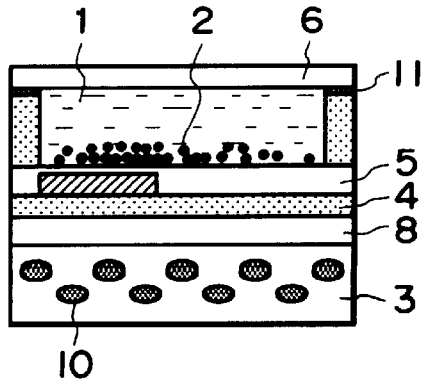

Then, a second substrate 6 is positionally aligned with the first substrate 3, and heat is applied to cure the adhesive layer 11 for bonding the substrates to form a cell structure (FIG. 4E). The electrodes 8 and 9 are electrically connected to a voltage supply (not shown) to complete the display device. The second substrate 6 may preferably comprise a heat-resistant material showing a high transmittance for visible light rays. For example, it is possible to use a polymeric material, such as PET or PES, or an inorganic material, such as glass or quartz.

The thus-prepared display device may allow two-color display, a color display or a gradational display, and exhibit a large viewing angle and a high contrast.

EXAMPLES

Hereinbelow, the present invention will be described more specifically based on Examples.

Example 1

A display device having a matrix of pixels (cells) arranged in 450 rows×450 columns was prepared in a planar size of 75 mm×75 mm. The display device had a unit cell (pixel structure having planar size of 120 $\mu$m×120 $\mu$m as illustrated in FIGS. 1A and 1B and was prepared in the following manner with reference to FIGS. 4A–4E illustrating production of one unit cell size.

Ferromagnetic cobalt-samarium alloy fine powder 10 was kneaded with melted PET (polyethylene terephthalate) to form a 200 $\mu$m-thick film, which was magnetized to provide a first substrate 3 (FIG. 4A) in an entire planar size of 75 mm×75 mm.

Then, the first substrate 3 was surface-coated by sputtering with a 200 nm-thick aluminum (Al) film which was then patterned into 120 μm-wide stripes of first electrodes 8. Then, the first electrodes 8 were coated with a 3 μm-thick first insulating layer 4 of PMMA (polymethyl methacrylate) colored in white with titanium oxide fine particles (FIG. 4B).

Then, a dark black-colored titanium carbide film was formed thereon and patterned by photolithography including dry etching into 50 μm-wide second electrodes 9. Then, the second electrodes 9 were further coated with a 0.5 μm-thick second insulating layer 5 of PMMA (FIG. 4C).

Then, the layer 5 was further coated with a photosensitive epoxy resin ("PMER N-CA2000 PMT-1", available from Tokyo Ohka Kogyo K.K.) by spin coating at 1000 rpm for 10 sec., followed by UV (ultraviolet) exposure and wet-development with a developer liquid for the photosensitive epoxy resin, to form partitioning walls 7 of 30 μm in height and 10 μm in width.

Then, a layer 11 of heat-bonding adhesive was applied on top of the partitioning walls 7, and the respective cells surrounded by the partitioning walls 7 were filled with a 20:1 (by weight) mixture of an insulating liquid 1 (of silicone oil at 5 centistokes) and ca. 1 μm-dia. black electrophoretic particles 2 of polystyrene/carbon/magnetite mixture. Separately, a pattern of heat-bonding adhesive layer 11 was also applied on a second substrate 6, and the second substrate 6 was superposed on the first substrate 3 with alignment of the respective adhesive patterns 11, followed by heat-bonding to form a display device with a unit structure as illustrated in FIG. 4E.

Then, after connecting the first electrodes and second electrodes to a voltage supply (not shown), the display device was driven by application of a drive voltage of 80 volts and the drive performances thereof were evaluated by observation through a microscope ("OPTIPHOTOPOL", available from Nikon K.K.) at a magnification of 25 for each cell of 120 μm×120 μm. As a result, as the black electrophoretic particles 2 were positively charged in the silicone oil 1, they were moved to a negative electrode.

More specifically, when the second electrode 9 as a positive electrode was supplied with +80 volts while the first electrode 8 was grounded (0 volt) to apply an electrostatic force larger than a magnetic Coulomb attraction force onto the positively charged and magnetized colored electrophoretic particles 2, the positively charged black electrophoretic particles 2 were moved onto the negative first electrode 8 to mask the white insulating layer 4, thereby providing a black display state of the pixel as viewed from the second substrate 6 (viewer's side) (FIG. 1B). On the other hand, when the applied voltage polarity was inverted, i.e., when the second electrode 9 was supplied with a voltage of −80 volts while the first electrode 8 was continually grounded to apply an electrostatic force larger than a magnetic Coulomb attraction force onto the positively charged and magnetized colored electrophoretic particles 2, the positively charged black electrophoretic particles 2 were moved onto the second electrode 9 to expose the white color of the first insulating layer 4, whereby a slightly grayish white display state was provided as whole. The response time was 30 msec or shorter.

Further, after the voltage application to the first electrode 8 and the second electrode 9, the applied voltage was removed by electrically opening the circuit of the first electrode 8, the second electrode 9 and the voltage supply, each of the black and white display states was retained in a memory state by a magnetic Coulomb attraction force acting on the colored electrophoretic particles 2 directed toward the first substrate 3.

Example 2

A display device of 450×450 pixels similar to the one of Example 1 except for a unit cell structure of 120 μm×120 μm as illustrated in FIG. 3 was prepared in a manner described below with reference to FIGS. 5A–5E similarly as in Example 1.

Figure 5A:
FIGS. 5A–5E are sectional views for illustrating a process for producing another display device according to the invention.

Ferromagnetic alnico fine powder 1 was mixed with polyimide varnish, and the resultant paint was applied onto a 100 μm-thick PES film 3 and baked to form a magnetic layer 51, which was then magnetized (FIG. 5A).

Figure 5B:
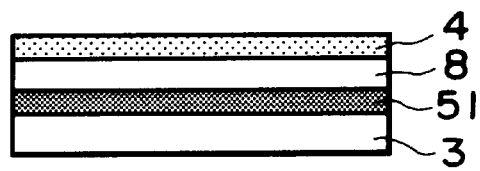

Then, the first electrode 3 provided with the magnetic layer 51 was coated with an Al film, followed by patterning to provide first electrodes 8, and then with a white first insulating layer 4 of polyimide colored in white by inclusion of titanium oxide fine particles (FIG. 5B).

Figure 5C:
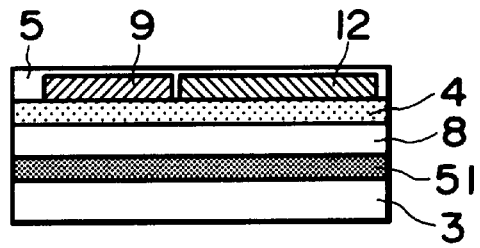
Figure 5D:
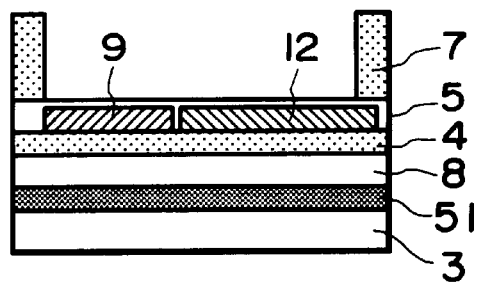

Then, a dark black-colored titanium carbide film was formed on the insulating layer 4 and patterned by photolithography including dry etching into 30 μm-wide stripes of second electrodes 9. Then, in parallel with the stripes of second electrodes 9, a dye-containing (colored) resin layer pattern 12 was formed on the first insulating layer 4. Then, the colored pattern 12 and the second electrodes 9 were coated with a second insulating layer 5 of PMMA (FIG. 5C).

Then, the layer 5 was further coated with a photosensitive epoxy resin ("PIMEL I-8606F", available from Asahi Kasei K.K.) by spin coating at 3000 rpm for 15 sec., followed by UV exposure and wet-development with a developer liquid for the photosensitive epoxy resin. to form partitioning walls 7 of 20 μm in height and 10 μm in width.

Figure 5E:
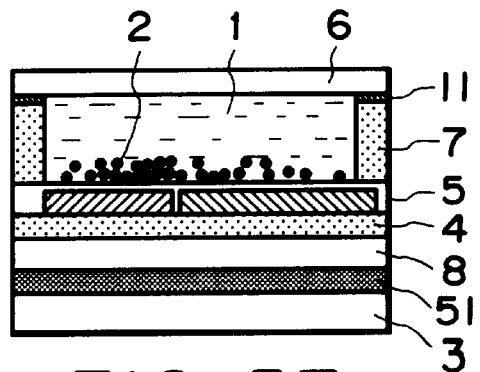

Then, a layer 11 of heat-bonding adhesive was applied on top of the partitioning walls 7, and the respective cells surrounded by the partitioning walls 7 were filled with a mixture of an insulating liquid 1 (of silicone oil) and ca. 1 μm-dia. black electrophoretic particles 2 of polystyrene/carbon/magnetite mixture. Separately, a pattern of heat-bonding adhesive layer 11 was also applied on a second substrate 6, and the second substrate 6 was superposed on the first substrate 3 with alignment of the respective adhesive patterns 11, followed by heat-bonding to form a display device with a unit structure as illustrated in FIG. 5E.

Then, after connecting the first electrodes and second electrodes to a voltage supply (not shown), the display device was driven by application of a drive voltage of 70 volts. During the voltage application, the positively charged black electrophoretic particles 2 in the silicone oil 1, were moved to a negative electrode.

More specifically, when the second electrode 9 as a positive electrode was supplied with +70 volts while the first electrode 8 was grounded (0 volt), the positively charged black electrophoretic particles 2 were moved onto the negative first electrode 8 to mask the colored insulating layer 12, thereby providing a black display state of the pixel as viewed from the second substrate 6 (viewer's side). On the other hand, when the applied voltage polarity was inverted, i.e., when the second electrode 9 was supplied with a voltage of −70 volts while the first electrode 8 was continually grounded, the positively charged black electrophoretic particles 2 were moved onto the second electrode 9 to expose the color of the colored layer 12. The response time was 30 msec or shorter.

By using a set of three colors of yellow, cyan and magenta, for the color layer 12 of three cells constituting one pixel, a selective color display performance at each cell was confirmed.

Further, after the voltage application to the first electrode 8 and the second electrode 9, the applied voltage was removed by electrically opening the circuit of the first electrode 8, the second electrode 9 and the voltage supply, each of the black and color display states was retained in a memory state by a magnetic Coulomb attraction force acting on the colored electrophoretic particles 2 directed toward the first substrate 3.

Example 3

The display device prepared in Example 1 was driven for gradational display in the following manner.

First, similarly as in Example 1, when the second electrode 9 was supplied with +80 volts for 30 msec. while the first electrode 8 was grounded (0 volt), the positively charged electrophoretic particles 2 were moved to mask the white first insulating layer 4 on the first electrode 8, thereby providing a black display state as viewed from the side of the second substrate 6 (FIG. 1B).

Then, when the first electrode 8 was supplied with +80 volts for 30 msec while the second electrode 9 was grounded, the positively charged electrophoretic particles 2 were moved onto the second electrode 9 to expose the while color of the first insulating layer 4 thereby providing a slightly grayish white display state (FIG. 2A).

Then, again from the state shown in FIG. 1B, the first electrode 8 was supplied with +80 volts for 5 msec instead of 30 msec while the second electrode 9 was grounded, whereby a portion of the positively charge black electrophoretic particles 2 was moved to the second electrode 9 while the remainder thereof was left on the first electrode 8 (FIG. 2B), thus showing a darker gray display state having a reflected light brightness of an about a half than in the case of the voltage application time of 30 msec. Thus, it was confirmed that a gradational display at multi-levels was possible by variously changing the voltage application time.

Example 4

Figure 6:
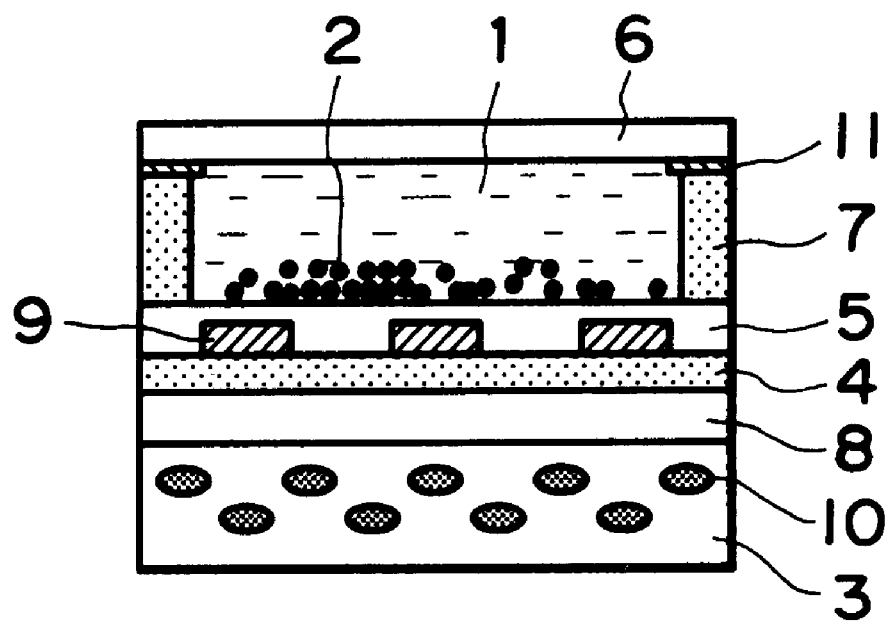
FIG. 6 is a sectional view of still another embodiment of the display device according to the invention.

A display device similar to the one of Example 1 except for a unit cell structure as shown in FIG. 6 was prepared through similar steps as in Example 1. Thus, in this example, three second electrodes 9 in a narrower width of 10 $\mu$m were formed at a pitch of 40 $\mu$m in one cell of 120 $\mu$m×120 $\mu$m in combination with colored electrophoretic particles 2 of ca. 0.5–1.0 $\mu$m in diameter.

The display device was driven by applying a drive voltage of 80 volts.

More specifically, when the second electrodes 9 were supplied with +80 volts while the first electrode 8 was grounded, the positively charged electrophoretic particles 2 in the silicone oil were moved to mask the white insulating layer 4 on the first electrode 8 to provide a black display state as viewed from the side of the second substrate 6. On the other hand, when the first electrode 8 was grounded and the second electrodes 9 were supplied with a negative voltage of −80 volts, the positively charged black electrophoretic particles 2 were moved onto the dark black-colored second electrodes 9 to expose white-colored first insulation layer 4, whereby a slightly grayish white display state was formed as viewed from the side of the substrate 2. In this example, as the width of the second electrodes 9 was reduced to 10 $\mu$m in a totally 120 $\mu$m-wide cell, the responsiveness of the display was improved to provide a shorter response time of 10 msec or below.

Example 5

The display device prepared in Example 1 was driven in a simple matrix mode in the following manner while noting a matrix unit of 3×3 pixels shown in FIG. 7A including scanning lines S1–S3 as first electrodes and data lines I1–I3 as second electrodes forming pixels P11–P13, P21–P23 and P31–P33 each in a size of 120 $\mu$m×120 $\mu$m at each intersection of the scanning lines and the data lines.

The display device, while noting the 3×3 matrix, was driven by applying a set of time serial waveforms as shown in FIG. 7B to provide a sequence of display states shown at FIGS. 7CA, 7CB, 7CC and 7CD at time T1, T2, T3 and T4, respectively, as observed through a microscope ("OPTIPHOTOPOL" available from Nikon K.K.) at a magnification of 25.

Figures 8A, 8B:
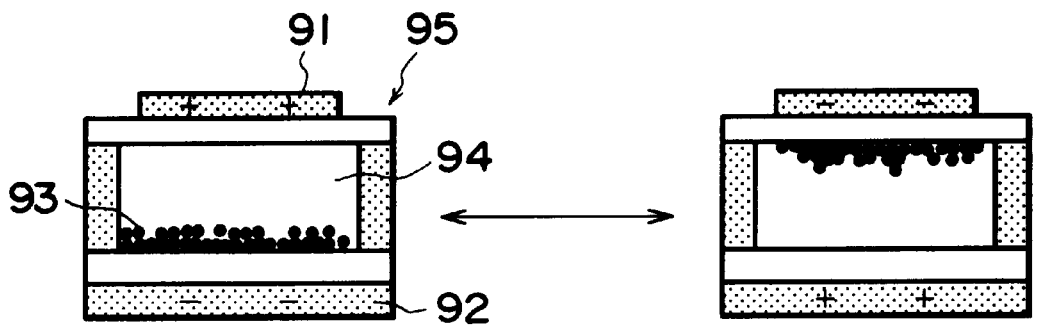
FIGS. 8A and 8B are sectional views showing two states of a known electrophoretic display device.

Referring to these figures, at time T1, scanning lines S1–S3 were supplied with −50 volts and data lines I1–I3 were supplied with +25 volts to provide a wholly black display state by application of −75 volts (S–I) at each pixel as shown at FIG. 8CA.

Then, at time T2, the scanning line S1 was supplied with +50 volts and the scanning lines S2 and S3 were supplied with 0 volt, while the data lines I1 and I3 were supplied with −25 volts and the data line I2 was supplied with +25 volts, whereby the pixels P11 and P13 were supplied +75 volts while the other pixels were supplied with +25 or −25 volts. As a result, the magnetized and positively charged colored electrophoretic particles 2 at the pixels P11 and P13 were moved onto the data lines I1 and I3 to display "gray" at these pixels.

Thus, at the pixels P11 and P13, an electrostatic force Fe (acting based on a voltage of +75 volts) exceeded a magnetic Coulomb attraction force Fm (threshold) exerted by the first substrate 3 onto the magnetic colored particles 2 whereby the colored particles 2 at these pixels were selectively moved onto the data lines I1 and I3. At the other pixels, the electrostatic force acted to retain the particles 2 at the pixels (based on a voltage of −25 volts) or subsided below the threshold (based on a voltage of +25 volts), thereby retaining the black display state thereat. As a result, a display state as shown at FIG. 7CB was formed.

Then, at time T3, the scanning line S2 was supplied with +50 volts and the scanning lines S1 and S3 were supplied with 0 volt, while the data line I2 was supplied with −25 volts and the data line I1 and I3 were supplied with +25 volts. As a result, only the pixel P22 was supplied with a voltage of +75 volts whereas the other pixels were supplied with +25 or −25 volts, below the threshold. As a result, only at the pixel P22, the magnetized and positively charged colored electrophoretic particles 2 were moved onto the data signal line I2 to provide the pixel P22 with a gray display state. At this time, the pixels other than the pixel P22 retained the display states formed at the time T2, thus providing a display state as shown at FIG. 7CC.

Similarly, by application of voltages as shown at time T4 shown in FIG. 7B to the respective lines, only the pixels P31 and P33 were converted into "gray" to provide a display state as shown in FIG. 7CD as a whole. Further, the display state shown in FIG. 7CD was retained by grounding all the scanning line S1–S3 and data lines I1–I3 as shown at time T5, thus showing a memory state owing to the magnetic Coulomb force acting on the magnetic particles 2 toward the first substrate 3.

In the above example, the first electrodes 8 were used as scanning lines Sm and the second electrodes 9 were used as data lines Im. However, a similar effect is obtained also by using the first electrodes 8 as data lines and the second electrodes 9 as scanning lines.

Figure 9:
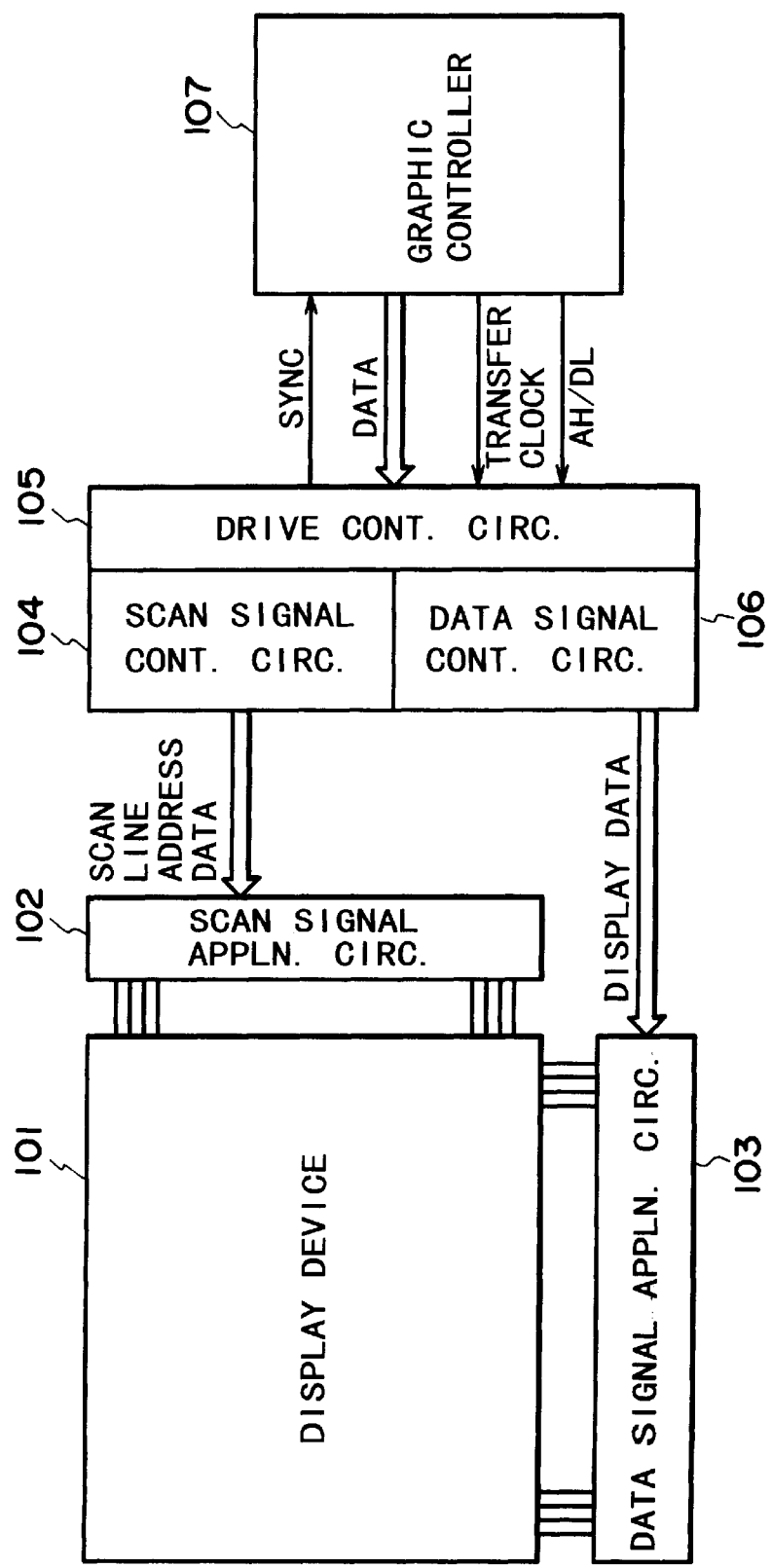
FIG. 9 is a control system for driving a matrix-type display device according to the invention.

FIG. 9 is a block diagram of an electrophoretic display apparatus including a display device of this example and a control system therefor. More specifically, the display apparatus includes a display device 101 having a matrix electrode structure formed of scanning lines Sm and data lines In as described with reference to FIG. 7A, a scanning signal application circuit 102 for applying scanning signal voltages to the pixels via the scanning lines Sm, a data signal application circuit 103 for applying data signals to the pixels via the data line In, a scanning signal control circuit 104, a data signal control circuit 106 and a drive control circuit 105. Each cell forming a pixel at each intersection of the scanning lines and the data lines is filled with colored electrophoretic particles dispersed in an insulating liquid. The display apparatus also includes a graphic controller 107, from which data is sent out and supplied via the drive control circuit 105 to the scanning signal control circuit 104 and the data signal control circuit 106 to be converted into address data and display data, respectively. Then, based on the address data, the scanning signal application circuit 102 successively generates scanning signals which are successively applied to the scanning lines Sm at the display unit 101. Further, based on the display data, data signals are generated by the data signal application circuit and applied to the data lines In of the display unit 101.

As described in detail above, according to the present invention, an electrophoretic display device exhibiting the following advantageous effects may be provided.

At the time of no voltage application, magnetized colored electrophoretic particles are held in position according to a magnetic Coulomb attraction force to exhibit a memory characteristic, so that no power consumption is required for holding a display state.

As the magnetized and colored electrophoretic particles are attracted by a magnetic Coulomb force to a substrate, a clear threshold characteristic is provided in electric field for moving particles, so that a simple matrix drive is well performed in an electrophoretic display.

The component members, such as electrodes, insulating layer, and partitioning walls may be formed on a single substrate through a simple process, so that a display device of a large area can be provided with a simple structure.

What is claimed is:

1. An electrophoretic display device, comprising: a first substrate and a second substrate disposed opposite to each other with a gap therebetween, a first electrode and a second electrode disposed at at least partially deviated positions on the first substrate, a transparent insulating liquid filling the gap between the first and second substrates, and colored electrophoretic particles carried in the insulating liquid so as to be movable between the first electrode and the second electrode, wherein the first substrate has a magnetism, and the electrophoretic particles also have a magnetism.

2. A display device according to claim 1, wherein the first electrode and the second electrode are each provided in plurality and arranged in a matrix form so that the first electrodes receive scanning signals and the second electrodes receive data signals.

3. A display device according to claim 1, wherein an insulating layer is formed so as to cover the first electrode and the second electrode on the first substrate.

4. A display device according to claim 3, wherein at least one of the first electrode, the second electrode and the insulating layer is colored to have an optical characteristic different from that of the colored electrophoretic particles.

5. A display device according to claim 1, wherein the first substrate is provided on its surface with a colored layer having an optical characteristic different from that of the colored electrophoretic particles, and a light reflection layer.

6. A display device according to claim 1, wherein the first substrate and the second substrate respectively comprise a polymer film.

7. A display device according to claim 1, wherein the second electrode and the colored electrophoretic particles are colored substantially in black.

8. A driving method for an electrophoretic display device of the type comprising a first substrate and a second substrate disposed opposite to each other with a gap therebetween, a first electrode and a second electrode disposed at at least partially deviated positions on the first substrate, a transparent insulating liquid filling the gap between the first and second substrates, and colored electrophoretic particles carried in the insulating liquid so as to be movable between the first electrode and the second electrode, wherein the first substrate has a magnetism, and the electrophoretic particles also have a magnetism;

said driving method comprising applying different levels of voltages between the first electrode and the second electrode, so that the colored electrophoretic particles are moved between the first and second electrodes at a voltage exerting an electrostatic force larger than a magnetic Coulomb force acting between the electrophoretic particles and the first substrate, and the colored electrophoretic particles are retained on the first or second electrode at a voltage exerting an electrostatic force smaller than the magnetic Coulomb force acting between the electrophoretic particles and the first substrate.

9. A display method according to claim 8, wherein the first electrode and the second electrode are each provided in a plurality and arranged in matrix form, and further comprising the steps of sequentially applying a scanning signal to the first electrodes and applying data signals to the second electrodes in synchronism with the scanning signal.

* * * * *

UNITED STATES PATENT AND TRADEMARK OFFICE
CERTIFICATE OF CORRECTION

PATENT NO.     : 6,239,896 B1                                           Page 1 of 1
DATED          : May 29, 2001
INVENTOR(S)    : Tsutomu Ikeda It is certified that error appears in the above-identified patent and that said Letters Patent is hereby corrected as shown below:

Column 4,
Line 64, "die (i.e.," should read -- side (i.e., --.

Column 11,
Line 22, "while" should read -- white --.

Column 14,
Line 46, "display" should read -- driving --.
Line 47, "a" should be deleted.
Line 48, "in" should read -- in a --.

Signed and Sealed this

Eleventh Day of June, 2002

Attest:

Attesting Officer

JAMES E. ROGAN
Director of the United States Patent and Trademark Office